(12) United States Patent
Basana et al.

(10) Patent No.: US 8,261,544 B2
(45) Date of Patent: Sep. 11, 2012

(54) CONTROL SYSTEM AND METHOD FOR BRAKING A HYDROSTATIC DRIVE MACHINE

(75) Inventors: J. Swapna Basana, Peoria, IL (US); Steven A. Daniel, East Peoria, IL (US); Norval Thomson, Dunlap, IL (US); Michael Anderson, East Peoria, IL (US); Daniel P. Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 930 days.

(21) Appl. No.: 12/229,927

(22) Filed: Aug. 28, 2008

(65) Prior Publication Data
US 2010/0050620 A1 Mar. 4, 2010

(51) Int. Cl.
F16D 31/02 (2006.01)
(52) U.S. Cl. .......................... 60/436; 60/445
(58) Field of Classification Search ............ 60/436, 60/442, 445
See application file for complete search history.

(56) References Cited

U.S. PATENT DOCUMENTS

| | | |
|---|---|---|
| 1,710,425 A | 4/1929 | Lorimer |
| 1,865,525 A | 7/1932 | La Brie |
| 2,121,869 A | 6/1938 | Greenawalt |
| 2,287,438 A | 6/1942 | Lindsay |
| 2,532,670 A | 12/1950 | La Brie |
| 1,053,434 A | 1/1967 | Swift |
| 4,103,489 A | 8/1978 | Fletcher et al. |
| 4,481,769 A | 11/1984 | Nagahara |
| 4,689,956 A | 9/1987 | Hein |
| 5,111,658 A | 5/1992 | Strenzke et al. |
| 5,145,238 A | 9/1992 | Strenzke et al. |
| 5,224,448 A | 7/1993 | Kandler |
| 5,390,759 A | 2/1995 | Gollner |
| 5,406,793 A | 4/1995 | Maruyama et al. |
| 5,529,546 A | 6/1996 | Ishino et al. |
| 5,576,962 A | 11/1996 | Ferguson et al. |
| 5,624,339 A | 4/1997 | Coutant et al. |
| 5,634,335 A | 6/1997 | Schniederjan |
| 5,996,343 A | 12/1999 | Kuras |
| 6,186,290 B1 | 2/2001 | Carlson |
| 6,226,987 B1 | 5/2001 | Hayashi et al. |
| 6,360,537 B1 | 3/2002 | Widemann |
| 6,454,033 B1 | 9/2002 | Nathan et al. |
| 7,105,972 B2 | 9/2006 | Gallant |
| 7,147,239 B2 | 12/2006 | Teslak et al. |
| 7,219,967 B2 | 5/2007 | Magnien et al. |
| 7,228,762 B2 | 6/2007 | Mende et al. |
| 7,296,496 B2 | 11/2007 | Shah |
| 2004/0074691 A1 | 4/2004 | Bombardier et al. |

FOREIGN PATENT DOCUMENTS

| | | |
|---|---|---|
| GB | 1285543 | 8/1972 |
| JP | 1275244 | 11/1989 |
| JP | 09030273 | 2/1997 |
| KR | 20080027916 | 3/2008 |

Primary Examiner — Daniel Lopez
(74) Attorney, Agent, or Firm — Liell & McNeil

(57) ABSTRACT

A method of braking a hydrostatic drive machine includes steps of reducing a displacement of a pump of a hydrostatic drive system to a non-zero displacement, and increasing a displacement of a motor of the hydrostatic drive system to a displacement that is less than a maximum displacement. The method also includes a step of accelerating an engine of the hydrostatic drive system toward a desired engine speed range.

10 Claims, 3 Drawing Sheets

CONTROL SYSTEM AND METHOD FOR BRAKING A HYDROSTATIC DRIVE MACHINE

TECHNICAL FIELD

The present disclosure relates generally to a control system and method for a hydrostatic drive machine, and more particularly to a control system and method for braking the hydrostatic drive machine.

BACKGROUND

Many machines, including large off-highway machines, are known to use hydrostatic drive systems to drive the ground engaging elements, such as wheels or tracks, of the machine. Such hydrostatic drive system commonly includes at least one pump driven by a prime mover, such as an internal combustion engine, of the machine. The pump may be configured to drive one or more sets of motors, which, in turn, power the ground engaging elements of the machine. The pump, and/or motors, may provide variable displacement, such that a fluid flow between the components of the hydrostatic drive system may be adjusted while the machine is running. As a result, direction, speed, and torque of the drive wheels may be continuously varied.

These machines typically include a service brake, or other wheel brake, for slowing or stopping the machine. Utilizing such brakes, however, may cause wear and/or damage to components of the drive system and, additionally, may add weight and cost to the machine. Alternatively, U.S. Pat. No. 5,111,658 teaches a method of braking a machine by controlling a pump of a hydrostatic drive system. Specifically, an electronic controller rapidly adjusts the displacement of the pump between one setting that permits the drive motor, or engine, to exert a braking moment and another setting that relieves the drive motor after a limiting speed value has been exceeded. The latter setting may incorporate the use of pressure limiting valves to reduce pressure within the hydrostatic drive system and, as a result, reduce the speed of the drive motor. This rapid adjustment between settings may occur until the machine is sufficiently slowed or stopped.

While the cited braking method may provide adequate slowing or stopping of the machine, it should be appreciated that there remains a continuing need for improved braking strategies and methods for hydrostatic drive machines. Specifically, there is a need for braking strategies having improved efficiency that may reduce the speed of the machine, such as according to requisite standards, reduce overspeeding of the components of the hydrostatic drive system, and reduce the need for a service brake, or wheel brake.

SUMMARY OF THE DISCLOSURE

In one aspect, a method of braking a hydrostatic drive machine includes steps of reducing a displacement of a pump of a hydrostatic drive system to a non-zero displacement, and increasing a displacement of a motor of the hydrostatic drive system to a displacement that is less than a maximum displacement. The method also includes a step of accelerating an engine of the hydrostatic drive system toward a desired engine speed range.

In another aspect, a hydrostatic drive machine includes an internal combustion engine, at least one variable displacement pump mechanically coupled to the internal combustion engine, and at least one variable displacement motor fluidly coupled to the variable displacement pump. The variable displacement motor is mechanically coupled to at least one ground engaging element of the hydrostatic drive machine. An electronic controller is in communication with the variable displacement pump and the variable displacement motor and, according to an exemplary embodiment, is configured to receive a machine braking request. The electronic controller is further configured to issue a pump displacement command to reduce a displacement of the variable displacement pump to a non-zero displacement, and issue a motor displacement command to increase a displacement of the variable displacement motor to a displacement that is less than a maximum displacement. Both the pump displacement command and the motor displacement command, which are issued in response to the machine braking request, are selected to accelerate the internal combustion engine toward a desired engine speed range.

In yet another aspect, a computer usable medium having computer readable program code thereon for braking a hydrostatic drive machine includes computer readable program code for receiving a machine braking request. The computer usable medium also includes computer readable program code for generating a pump displacement command for reducing a displacement of a variable displacement pump to a non-zero displacement in response to the machine braking request. Further, the computer usable medium includes computer readable program code for generating a motor displacement command for increasing a displacement of a variable displacement motor to a displacement that is less than a maximum displacement in response to the machine braking request. Computer readable program code is also provided for selecting the pump displacement command and the motor displacement command to accelerate an internal combustion engine toward a desired engine speed range.

DETAILED DESCRIPTION

Figure 1:
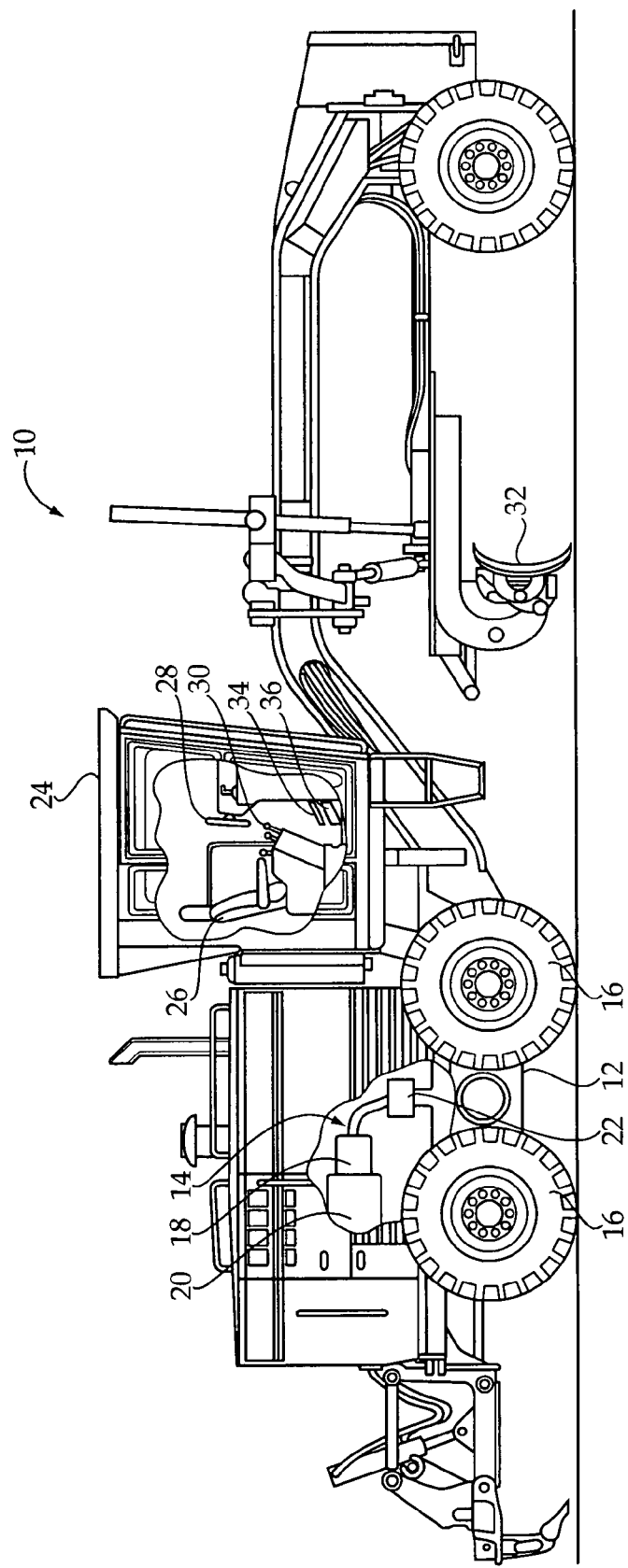
FIG. 1 is a side diagrammatic view of a hydrostatic drive machine, according to the present disclosure.

An exemplary embodiment of a machine 10 is shown generally in FIG. 1. The machine 10 may be a motor grader, as shown, or any other off-highway or on-highway vehicle having a hydrostatic drive system. As such, machine 10 may also be referenced herein as a hydrostatic drive machine or, more specifically, a hydrostatic drive motor grader. In the illustrated embodiment, machine 10 generally includes a frame 12 having a hydrostatic drive system 14 supported thereon for driving ground engaging elements 16, such as tracks or wheels (shown), of the machine 10. A strategy presented herein for controlling the hydrostatic drive system 14 may be widely applicable to any hydrostatic drive machine and, therefore, it should be appreciated that the specific embodiments provided are presented for exemplary purposes only.

The hydrostatic drive system 14 may generally include at least one pump 18, such as a hydraulic pump, driven by a prime mover, such as a compression or spark-ignited internal combustion engine 20 or electric motor, of the machine 10. The pump 18 may be configured to drive at least one motor 22, such as one or more sets of hydraulic motors, which, in turn, power the ground engaging elements 16 of the machine 10. Each of the pump 18 and motor 22 may provide variable displacement, such that a fluid flow between the components of the hydrostatic drive system 14 may be adjusted while the machine 10 is running. As a result, direction, speed, and torque of the ground engaging elements 16, or wheels, may be continuously varied.

An operator control station 24 may also be supported on the frame 12 and may include various controls and devices that may be used by an operator of the machine 10. For example, the operator control station 24 may include known devices, such as a seat assembly 26, a steering device 28, and one or more machine operation controllers 30. According to a specific example, a first machine operation controller 30 may be provided for controlling directional movement of the machine 10, while a second machine operation controller 30 may be provided for controlling operation of an implement 32, such as a scraper blade, of the machine 10. The operator control station 24 may include additional machine controllers, such as an accelerator pedal 34 for controlling machine speed, and a braking pedal 36 for slowing or stopping movement of the machine 10. Although separate controls are described for controlling direction of travel and speed of the machine 10, it should be appreciated that a single control, such as a lever, may be provided for controlling both machine speed and travel direction.

Figure 2:
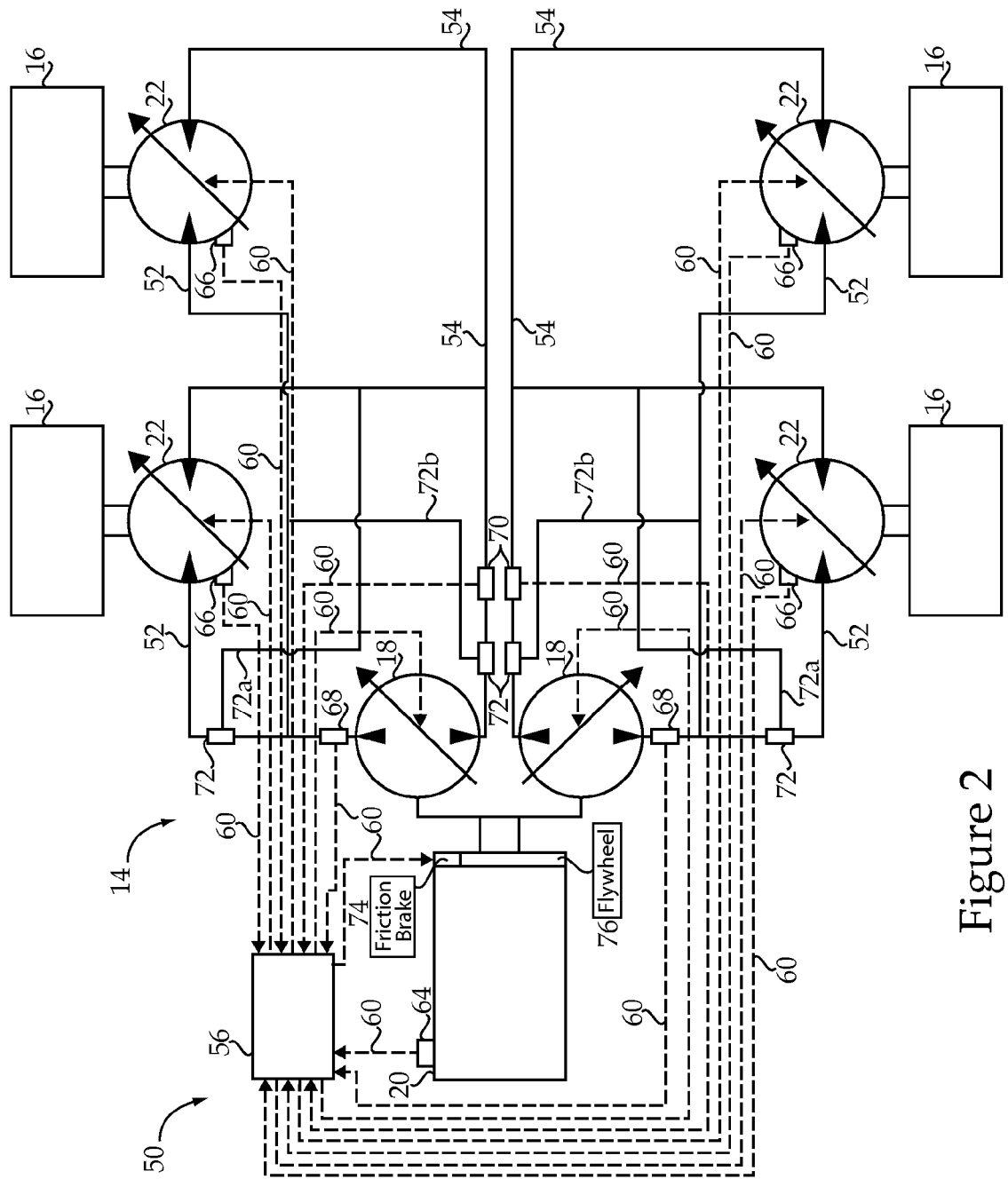
FIG. 2 is a schematic of a hydrostatic drive system of the hydrostatic drive machine of FIG. 1, according to the present disclosure.

A specific embodiment of the hydrostatic drive system 14 is shown in FIG. 2 to further describe a control system 50 of the hydrostatic drive machine 10. As shown, the hydrostatic drive system 14 may include a pair of variable displacement pumps 18 mechanically coupled to the internal combustion engine 20. Each variable displacement pump 18 may include a bi-directional variable displacement swash plate pump, such that adjustment of the swash plate of the pump 18 may adjust the displacement thereof. It should be appreciated that the term "bi-directional" may refer to a pump that is capable of pumping fluid, such as hydraulic fluid, in either of two directions. As such, the angle of the swash plate may vary between first, or positive, displacement orientations, such as for forward travel of the machine 10, and second, or negative, displacement orientations, such as for reverse travel of the machine 10. It should be appreciated that a zero displacement, or swash plate angle of zero, may result in the pump 18 displacing no fluid while rotating and, thus, not driving the machine 10.

According to the exemplary embodiment, each of the variable displacement pumps 18 may be fluidly coupled, such as in parallel, to a pair of variable displacement motors 22. It should be appreciated that the fluid coupling of the variable displacement motors 22 to the variable displacement pumps 18 may allow the relative swash plate angles of the pumps 18 to determine the direction and flow rate of the hydraulic fluid that is pumped to each motor 22. In addition, the displacements of the motors 22 may be similarly varied, by adjusting swash plate angles, between minimum and maximum displacements to adjust a torque delivered to the ground engaging elements 16. The motors 22, as should be appreciated, may not be bi-directional, as described with reference to the pumps 18. However, bi-directional motors may also be used without deviating from the scope of the present disclosure.

As shown, each of the variable displacement motors 22 may be mechanically coupled to one of the ground engaging elements 16. More specifically, each of the variable displacement motors 22 may be configured to drive an axle shaft, which, in turn, may be configured to drive a final drive assembly, or final drive planetary gear set, coupled with each ground engaging element 16. Therefore, pumping hydraulic fluid from the variable displacement pumps 18 to the variable displacement motors 22 through a first set of fluid lines 52 may drive the ground engaging elements 16 in a first, or forward, direction. The speed and torque, as should be appreciated, may be dependent upon the selected displacements of the respective pumps 18 and motors 22. Pumping fluid in the opposite direction, through a second set of fluid lines 54, may drive the ground engaging elements 16 in a second, or reverse, direction at a speed and torque determined by the displacements of the pumps 18 and motors 22.

The control system 50, referenced above, may include at least one electronic controller 56 configured to control operation of the hydrostatic drive system 14. As such, the electronic controller 56 may also be referenced herein as a drive system electronic controller. Although a single electronic controller 56 is described, it should be appreciated that the control system 50 may include a plurality of electronic controllers. For example, an additional electronic controller may be provided for controlling operation of the internal combustion engine 20. As such, each electronic controller of the control system 50 may be configured to communicate laterally and/or in a hierarchical manner. Therefore, it should be appreciated that a variety of control systems 50, ranging from simple to complex, are contemplated for use with the present disclosure.

The electronic controller 56 may be of standard design and may include a processor, such as, for example, a central processing unit, a memory, and an input/output circuit that facilitates communication internal and external to the electronic controller 56. The processor may control operation of the electronic controller 56 by executing operating instructions, such as, for example, computer readable program code stored in memory, wherein operations may be initiated internally or externally to the electronic controller 56. A control scheme, an example of which is provided below, may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 56. One skilled in the art will appreciate that any computer based system or device utilizing similar components for controlling the components of the hydrostatic drive system 14, is suitable for use with the present disclosure.

The electronic controller 56 may be in communication with each of the internal combustion engine 20, the variable displacement pumps 18, and the variable displacement motors 22. More specifically, the electronic controller 56 may be in communication with the variable displacement pumps 18 to adjust swash plate angles thereof, resulting in the variable displacement described above. According to one embodiment, pump displacement solenoids, such as proportional solenoids, may be provided for varying the swash plate angles and controlling the direction of fluid flow. However, various means for adjusting displacement and fluid flow are known and may be incorporated into the present disclosure. Accordingly, the electronic controller 56 may issue pump displacement commands and/or additional commands, via wired or wireless communication lines 60, to the variable displacement pumps 18 to effectively control the displacement and direction of fluid flow of the respective variable displacement pumps 18.

Similarly, the electronic controller 56 may be in communication with the variable displacement motors 22 to adjust angles of swash plates of the motors 22. Specifically, the electronic controller 56 may issue motor displacement commands via communication lines 60 to control the displacement of the respective variable displacement motors 22. Controlling the displacement of the variable displacement motors 22, using proportional solenoids or other similar devices, may allow for torque adjustment, as necessary to propel the hydrostatic drive machine 10. As stated above, devices for controlling displacement and fluid flow are generally known and, therefore, will not be discussed herein in greater detail.

The electronic controller 56 may also be in communication with various other sensors and/or devices of the hydrostatic drive system 14, as necessary to properly control the hydrostatic drive machine 10. For example, an engine speed sensor 64 may produce a signal, communicated to the electronic controller 56 via communication lines 60, in response to a rotational speed of the internal combustion engine 20. Similarly, motor speed sensors 66, positioned to detect rotational speeds of the variable displacement motors 22, may provide corresponding motor speed signals to the electronic controller 56 via communication lines 60. Although sensors may also be provided for detecting rotational speeds of the variable displacement pumps 18, it should be appreciated that the speed of the pumps 18 may be determined based on the specific drive ratio between the internal combustion engine 20 and the pumps 18. As such, rotational speeds of the variable displacement pumps 18 may be readily determined by the electronic controller 56. Such rotational speeds, as should be appreciated, may be used by the electronic controller 56, along with displacement orientations, to evaluate fluid flows within the first set of fluid lines 52 and the second set of fluid lines 54.

Additional sensors may also be provided for detecting pressure and/or temperature levels of fluids, such as hydraulic fluids, within the fluid lines 52 and 54. Specifically, first sensors 68 may be configured to sense pressure levels or temperatures within the first fluid lines 52, and transmit the sensed pressure levels or temperatures to the electronic controller 56 via communication lines 60. Similarly, second sensors 70 may be configured to transmit detected pressure levels or temperatures within the second fluid lines 54 to the electronic controller 56. According to one example, pressure level values, as may be detected by the first sensors 68, may be used by the electronic controller 56, along with displacement orientations, to evaluate the torque provided to the ground engaging elements 16 by the variable displacement motors 22. In addition, pressure level values detected by the second sensors 70 may be used by the electronic controller 56, along with displacement orientation values, to evaluate engine torque, as affected by the variable displacement pumps 18. It should be appreciated that first sensors 68 and second sensors 70 may be pressure sensors or temperature sensors, as desired. If necessary, an implementation may include both pressure sensors and temperature sensors.

The hydrostatic drive system 14 may also include one or more relief valves 72 fluidly connected to one or both of the first fluid lines 52 and the second fluid lines 54, as shown. If fluid flow and/or pressure becomes too high in either of the first or second fluid lines 52 and 54, the corresponding relief valves 72 may be actuated, in a known manner, such as to relieve fluid pressure to the pumps 18 or motors 22, via relief lines 72a or 72b, respectively. Such relief valves 72, as should be appreciated, may be provided to reduce risk of damage to any of the variable displacement pumps 18 and variable displacement motors 18. To reduce risk of damage to the internal combustion engine 20, a known friction brake 74, or disc brake, may be provided. Specifically, the friction brake 74, which may be electronically actuated, may be positioned to reduce the speed of a flywheel 76, when actuated. The flywheel 76, as should be appreciated, may mechanically couple the internal combustion engine 20 to the variable displacement pumps 18. It should be appreciated that engine compression brakes or exhaust brakes may be used in addition to, or as an alternative to, the friction brake 74 to prevent overspeeding of the internal combustion engine 20.

During typical operation of the machine 10, the internal combustion engine 20 may be set to operate at a predetermined engine speed via one of the machine operator controllers 30, such as an engine throttle. Specifically, the electronic controller 56, or other controller, may control fueling of the internal combustion engine 20 to provide an engine speed that is indicated by the engine throttle. As such, the variable displacement pumps 18 may be driven at rotational speeds proportional to the selected engine speed. The speed, or ground speed, of the machine 10 may be regulated using the components, described herein, of the hydrostatic drive system 14. Specifically, for example, the machine speed may be controlled based on a detected position of the accelerator pedal 34, or other similar control device. In response to the detected position, the electronic controller 56 may control the speed of each motor 22 by proportionally controlling the displacement of the associated pumps 18, thereby regulating the fluid flow to the motors 22, which drive the ground engaging elements 16. As described above, the electronic controller 56 may communicate with pumps 18 to control an amount and direction of fluid flow through the first and second fluid lines 52 and 54.

Releasing the accelerator pedal 34 or returning the accelerator pedal 34, or other similar lever or device, to a neutral position may cause the electronic controller 56 to correspondingly move the displacements of the variable displacement pumps 18 toward zero displacement, at which the pumps 18 are not displacing fluid. Although, in some instances, this may eventually slow or stop the machine 10, since the pumps 18 are no longer pumping fluid to the motors 22, it should be appreciated that additional stopping or braking capabilities may be necessary. For example, emergency braking or "quick" braking may often be required during typical operation of the machine 10, requiring a quicker braking response than may be provided by setting the pump displacements to zero.

Figure 3:
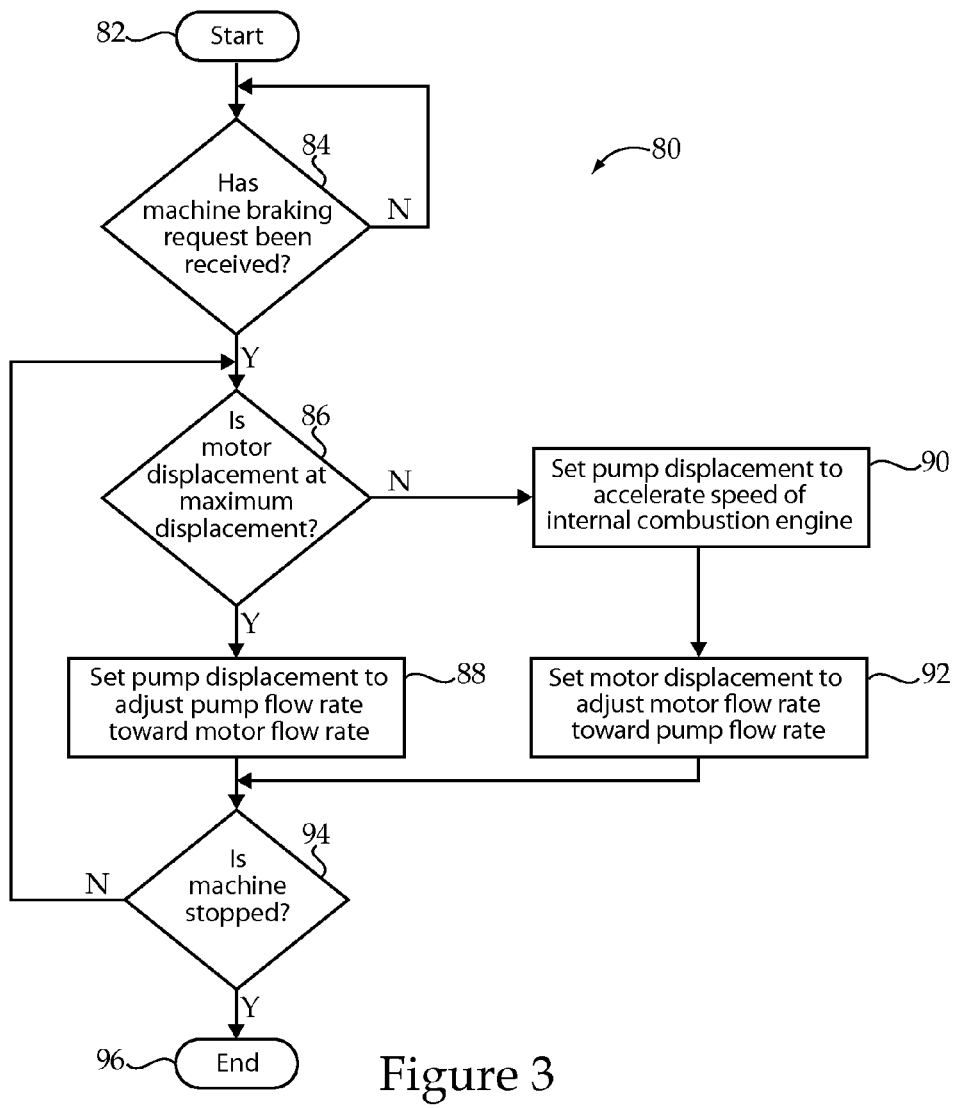
FIG. 3 is a logic flow chart of one embodiment of a method for braking the hydrostatic drive machine of FIG. 1, according to the present disclosure.

Turning to FIG. 3, there is shown a flow chart 80 representing an exemplary control method for braking, or retarding, the hydrostatic drive machine 10 according to the present disclosure. The method may be implemented by the control system 50 of the machine 10. According to one example, the steps implementing the disclosed method may be in the form of computer readable program code stored in memory and executed by a processor of the electronic controller 56, or other computer usable medium. The method may run continuously or may be initiated in response to a predetermined event. According to one embodiment, the method may be initiated in response to a detected movement of the braking pedal 36. It should be appreciated, however, that the method may be initiated in response to actuation of various other devices, or in response to a predetermined condition of the machine 10.

The method begins at a START, Box 82. From Box 82, the method proceeds to Box 84, which includes the step of determining if a machine braking request has been received. Specifically, according to one embodiment, the electronic controller 56 may be in communication with a position sensor associated with the braking pedal 36, such that a corresponding braking pedal position signal is transmitted to the electronic controller 56. The electronic controller 56 may monitor the braking pedal position signal to determine if the machine braking request has been received. According to one example, the machine braking request may be determined based on a level of actuation of the braking pedal 36. According to an additional, or alternative, example, the machine braking request may be based on the level of actuation of the braking pedal 36 as a function of time. If the machine braking request is not received, the method may continuously monitor, or standby, for such a request.

When the machine braking request is received, the method proceeds to Box 86. At Box 86, the electronic controller 56 determines if the displacements of the variable displacement motors 22 are at maximum displacement. If the motor displacements are set to maximum displacement, the method may proceed to Box 88. However, if the motor displacements are less than maximum displacement, the method may proceed to Box 90. At Box 90, the electronic controller 56 may issue pump displacement commands to the variable displacement pumps 18 to effectively accelerate the speed of the internal combustion engine 20 toward a desired engine speed range. According to one example, the desired engine speed range may include one or more engine speeds that have been identified as absorbing maximum power from the variable displacement pumps 18.

It should be appreciated that, because the pump displacements may affect the engine load, the engine speed may be regulated by controlling the pump displacements. It should also be appreciated that, while decreasing the pump displacements may increase the engine speed, such adjustments may also decrease torque to the internal combustion engine 20, which may be a function of pump displacement and pressure. As such, the motor displacements, affecting pressure and fluid flow to the pumps 18, may also be adjusted to induce the necessary torque to accelerate the internal combustion engine 20 to the desired engine speed range. According to a specific example, a well known proportional integral controller may be given the current engine speed, as provided by engine speed sensor 64, and a desired engine speed, within the desired engine speed range, to produce the pump displacement commands.

From Box 90, the method continues to Box 92, which includes the electronic controller 56 issuing motor displacement commands to the variable displacement motors 22 to effectively adjust a motor flow rate toward a pump flow rate. Specifically, the motor displacement commands may be selected to equalize the fluid flow within the first fluid lines 52 and the second fluid lines 54. According to one example, the fluid flow within the first fluid lines 52 may be a product of pump displacement and pump speed, while the fluid flow within the second fluid lines 54 may be a product of motor displacement and motor speed. Therefore, to equalize, or attempt to equalize, the fluid flows, the motor displacements may be adjusted to values corresponding to the fluid flow within the first fluid lines 52 divided by the current motor speeds, as determined by the motor speed sensors 66. It should be appreciated that the method steps of Box 90 and Box 92, along with additional method steps, may be performed simultaneously or near simultaneously.

From Box 92, the method proceeds to Box 94, where the electronic controller 56 determines if the hydrostatic drive machine 10 is sufficiently slowed or stopped. If it is determined that the machine 10 is not sufficiently slowed or stopped, the method returns to Box 86, where the query described above is repeated. If, at Box 86, it is determined that the motor displacements are at maximum displacement, the method proceeds to Box 88, where the electronic controller 56 issues pump displacement commands to the variable displacement pumps 18 to effectively adjust a pump flow rate toward a motor flow rate. Specifically, the pump displacement commands may be selected to equalize the fluid flow within the first fluid lines 52 and the second fluid lines 54. As described above, to equalize, or attempt to equalize, the fluid flows, the pump displacements may be set to values corresponding to the fluid flow within the second fluid lines 54 divided by the current pump speeds.

Figure 4:
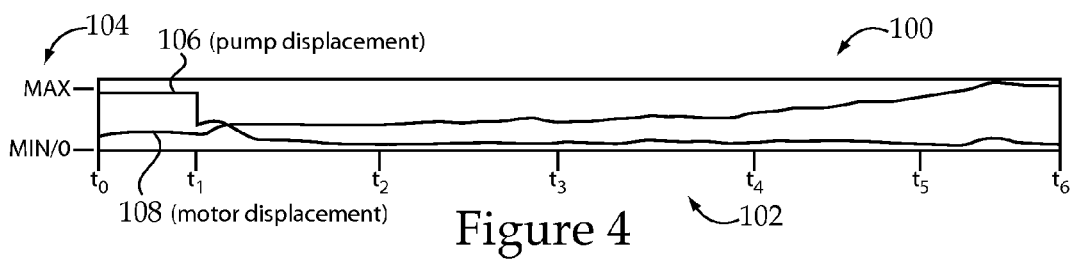
FIG. 4 is a graph illustrating a braking event in the hydrostatic drive machine of FIG. 1, according to exemplary embodiment of the present disclosure.
Figure 5:
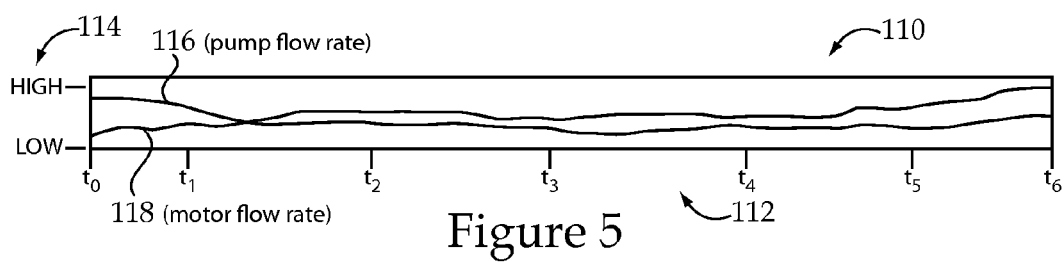
FIG. 5 is a graph illustrating pump and motor flow rates during the braking event of FIG. 4 according to an exemplary embodiment of the present disclosure.

From Box 88, the method also proceeds to Box 94, where the electronic controller 56 determines if the hydrostatic drive machine 10 is sufficiently slowed or stopped. If it is determined that the machine 10 is sufficiently slowed or stopped, the method proceeds to an END, at Box 96. Otherwise, the method returns to Box 86, as stated above. Turning now FIG. 4, a graph 100 of time 102, in seconds, versus displacement 104 is shown to illustrate an exemplary braking event. Specifically, as a result of the braking method, when the machine braking request is received, such as at time $t_1$, the pump displacements 106 may be decreased, such as to non-zero displacements, to accelerate the internal combustion engine 20 toward the desired engine speed range. Simultaneously, or near simultaneously, the motor displacements 108 may be increased, to less than maximum displacement. While immediately increasing the motor displacements 108 to maximum displacement may provide increased braking, by increasing pressure and flow, it should be appreciated that such adjustments may necessitate an increased use of relief valves 72, resulting in a heat generating flow. To limit such heat generating flow, the motor displacements 108 may be selected to equalize flows within the fluid lines 52 and 54, as described above. A graph 110 of time 112, in seconds versus volumetric flow rate 114, such as in liters per minute, is shown in FIG. 5 to illustrate the maintenance of equalized pump flow rates 116 and motor flow rates 118.

As a result of adjusting the motor displacements 108 to equalize flows within the fluid lines 52 and 54, the motor displacements may eventually reach maximum displacements, as shown between times $t_5$ and $t_6$. When this occurs, the displacements 106 of the variable displacement pumps 18 may then be selected to equalize, or attempt to equalize, the fluid flows within the first set of fluid lines 52 and the second set of fluid lines 54. As a result, the hydrostatic drive machine 10 may be more efficiently slowed or stopped, such as according to requisite standards, while reducing wear or damage to components of the hydrostatic drive system 14. Further, braking of the hydrostatic drive machine 10 according to the braking method described herein may reduce the need for service brakes, or wheel brakes. Although parking brakes or emergency brakes may be provided, according to some embodiments, the hydrostatic drive machine 10 may be free of any wheel brakes, relying solely on the disclosed braking method to retard the machine 10.

It should be appreciated that enhancements or modifications may be made to the braking method of FIG. 3, without deviating from the scope of the present disclosure. According to one example, the braking method may be used in combination with the friction brake 74, described above. Specifically, the friction brake 74 may be actuated if the speed of the internal combustion engine 20 exceeds a predetermined speed, such as the desired engine speed range, to prevent damage to the internal combustion engine 20. In addition, the braking method may include logic to reduce fueling of the internal combustion engine 20 when predetermined conditions have been met. For example, the electronic controller 56 may reduce fueling, such as by simulating a zero throttle, if fueling is requested during execution of the braking method. Alternatively, the electronic controller 56 may set the pump displacements to zero displacement when such fueling begins.

According to an additional enhancement, the braking method described above may also check for tire slip, using known sensors, at the ground engaging elements 16. If tire slip is detected and exceeds a predetermined threshold, the displacements of the variable displacement motors 22 may be reduced, thus reducing torque to the ground engaging elements 16. Further, the braking method may be modified to adjust the motor displacement commands to reduce such occurrences of tire slip.

INDUSTRIAL APPLICABILITY

The present disclosure finds potential application in any machine that utilizes a hydrostatic drive system. Further, the disclosure may be specifically applicable to hydrostatic drive machines utilizing one or more variable displacement pumps configured to drive one or more variable displacement motors. Yet further, the present disclosure may be applicable to hydrostatic drive machines requiring an efficient braking strategy that reduces the need for a service brake, or wheel brake. Such machines may include, but are not limited to, off-highway machines, such as graders, on-highway machines, such as buses and trucks, and other machines known in the art. Graders, as should be appreciated by those skilled in the art, are also commonly referred to as motor waders or road graders.

Referring generally to FIGS. 1-3, a hydrostatic drive machine 10 may include a hydrostatic drive system 14 including a pair of variable displacement pumps 18 mechanically coupled to an internal combustion engine 20. Each variable displacement pump 18 may be fluidly coupled to a pair of variable displacement motors 22, which, in turn, are mechanically coupled to ground engaging elements 16 of the machine 10. A control system 50, including at least one electronic controller 56, may be provided for controlling operation of the hydrostatic drive system 14, including executing a braking method for braking the hydrostatic drive machine 10 in response to a machine braking request.

Specifically, the electronic controller 56 may be configured to receive the machine braking request and, in response, issue pump displacement commands to the variable displacement pumps 18 to reduce the displacement of the pumps 18 to non-zero displacements. In addition, the electronic controller 56 may be configured to issue motor displacement commands to the variable displacement motors 22 to increase the displacement of the motors 22 to displacements that are less than maximum displacement, for reasons described above. It should be appreciated that one or both of these displacement commands may be selected or adjusted to accelerate the internal combustion engine 20 toward a desired engine speed range. Such engine speeds may include speeds at which the internal combustion engine 20 may provide increased frictional or retarding power.

The control system 50 and braking method described herein provide means for braking the hydrostatic drive machine 10 using the hydrostatic drive system 14. The braking method described may provide efficient braking of the hydrostatic drive machine 10 by utilizing the internal combustion engine 20 to absorb power. In addition, the braking method of the present disclosure may reduce heat generating flow over relief valves 72, reduce risk of damage, such as by overspeeding, to components of the hydrostatic drive system 14, and reduce the need for service brakes, or wheel brakes.

What is claimed is:

1. A method of braking a hydrostatic drive machine, comprising:
    reducing a displacement of a pump of a hydrostatic drive system to a non-zero displacement and simultaneously setting a displacement of a motor of the hydrostatic drive system to adjust a motor flow rate toward a pump flow rate while the motor displacement is less than a maximum displacement; and
    setting the pump displacement to adjust the pump flow rate toward the motor flow rate while the motor displacement is at the maximum displacement.

2. The method of claim 1, further including releasing a portion of a flow through a pressure relief valve.

3. A method of braking a hydrostatic drive machine, comprising:
    reducing a displacement of a pump of a hydrostatic drive system to a non-zero displacement;
    increasing a displacement of a motor of the hydrostatic drive system to a displacement that is less than a maximum displacement;
    accelerating all engine of the hydrostatic drive system toward a desired engine speed range; and
    reducing a speed of a flywheel that mechanically couples the engine and the pump using a friction brake if a speed of the engine exceeds the desired engine speed range.

4. The method of claim 1, wherein the step of setting the motor displacement includes adjusting the motor displacement to reduce tire slip of ground engaging elements of the hydrostatic drive machine.

5. A hydrostatic drive machine, comprising:
    an internal combustion engine;
    at least one variable displacement pump mechanically coupled to the internal combustion engine;
    at least one variable displacement motor fluidly coupled to the at least one variable displacement pump;
    at least one ground engaging element mechanically coupled to the at least one variable displacement motor; and
    an electronic controller in communication with the at least one variable displacement pump and the at least one variable displacement motor, wherein the electronic controller is configured to receive a machine braking request, identify a current motor displacement, issue a pump displacement command to reduce a displacement of the at least one variable displacement pump to a non-zero displacement and simultaneously issue a motor displacement command to set a displacement of the at least one variable displacement motor to adjust a motor flow rate toward a pump flow rate while the current motor displacement is less than a maximum displacement, and issue a pump displacement command to set the pump displacement to adjust the pump flow rate toward the motor flow rate while the motor displacement is at the maximum displacement.

6. The hydrostatic drive machine of claim 5, further including two variable displacement pumps mechanically coupled to the internal combustion engine, and two variable displacement motors fluidly coupled to each of the two variable displacement pumps.

7. The hydrostatic drive machine of claim 6, wherein the hydrostatic drive machine is a grader.

8. A hydrostatic drive machine, comprising;
an internal combustion engine;
at least one variable displacement pump mechanically coupled to the internal combustion engine;
at least one variable displacement motor fluidly coupled to the at least one variable displacement pump;
at least one ground engaging element mechanically coupled to the at least one variable displacement motor;
an electronic controller in communication with the at least one variable displacement pump and the at least one variable displacement motor, wherein the electronic controller is configured to receive a machine braking request, issue a pump displacement command to reduce a displacement of the at least one variable displacement pump to a non-zero displacement in response to the machine braking request, and issue a motor displacement command to increase a displacement of the at least one variable displacement motor to a displacement that is less than a maximum displacement in response to the machine braking request, wherein the pump displacement command and the motor displacement command are selected to accelerate the internal combustion engine toward a desired engine speed range; and
a friction brake actuable to slow rotation of a flywheel that mechanically couples the internal combustion engine and the at least one variable displacement pump.

9. The hydrostatic drive machine of claim 8, wherein the electronic controller is in communication with the friction brake and is configured to issue a friction brake command to actuate the friction brake in response to a speed of the internal combustion engine exceeding the desired engine speed range.

10. A non-transitory computer usable storage medium having computer readable program code thereon for braking a hydrostatic drive machine, comprising:
computer readable program code for receiving a machine braking request;
computer readable program code for identifying a current motor displacement;
computer readable program code for generating a pump displacement command for reducing a displacement of a variable displacement pump to a non-zero displacement and simultaneously generating a motor displacement command to set a displacement of a variable displacement motor to adjust a motor flow rate toward a pump flow rate while the current motor displacement is less than a maximum displacement; and
computer readable program code for generating the pump displacement command to set the pump displacement to adjust the pump flow rate toward the motor flow rate while the motor displacement is at the maximum displacement.

* * * * *